United States Patent [19]

Johnson

[11] 4,427,229
[45] Jan. 24, 1984

[54] STREAMLINING APPARATUS

[76] Inventor: David W. Johnson, 1884 Sunset Blvd., San Diego, Calif. 92103

[21] Appl. No.: 337,809

[22] Filed: Jan. 8, 1982

[51] Int. Cl.³ .............................................. B62D 35/00
[52] U.S. Cl. .......................................... 296/1 S; 52/2; 224/316
[58] Field of Search ........................ 296/1 S, 91; 52/2; 224/316, 318, 320

[56] References Cited

U.S. PATENT DOCUMENTS 4,030,779  6/1977  Johnson ................................ 296/1 S
4,088,362  5/1978  Mollura ................................ 296/1 S Primary Examiner—Bruce H. Stoner, Jr.
Assistant Examiner—John A. Carroll
Attorney, Agent, or Firm—Ralph S. Branscomb

[57] ABSTRACT

A streamlining apparatus is provided designed particularly toward the needs of shipping containers. The body of the unit is inflatable, and it is removably attached to the front of a container by a pair of holes which engage in loading poles in the upper front corners of the container, the poles remaining with the container as part of the mounting frame when it is being hauled. The poles permit mounting the streamlining body from the ground so that a lone driver can mount it unassisted without climbing up on the cab or the container.

15 Claims, 7 Drawing Figures

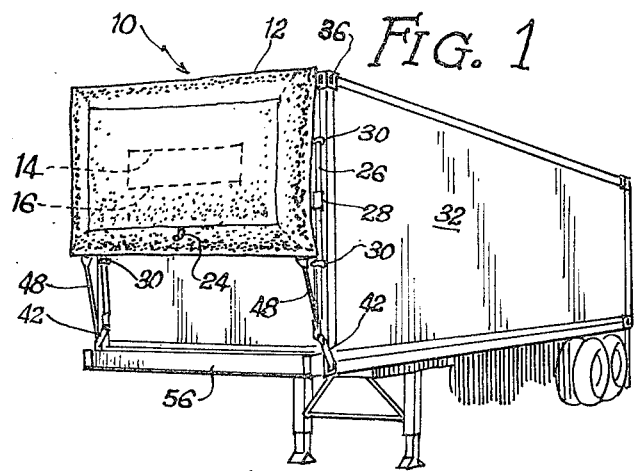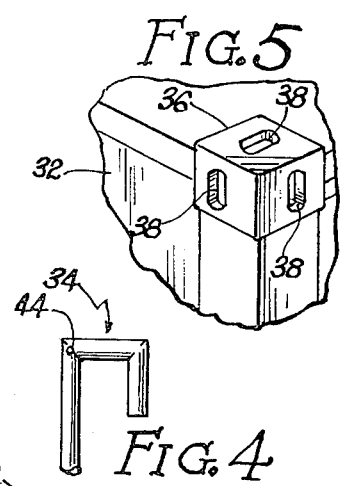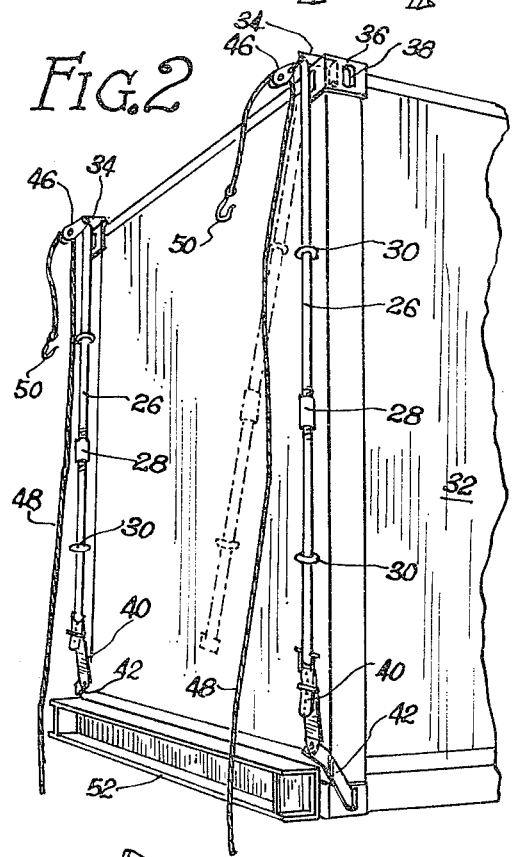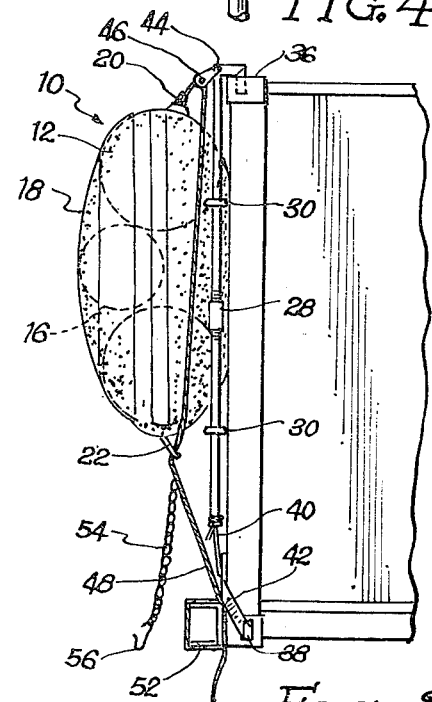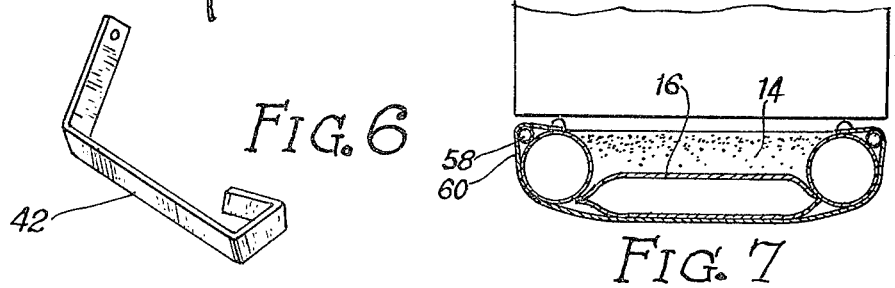

ns,427,229

STREAMLINING APPARATUS

BACKGROUND OF THE INVENTION

It is well known that the addition of a streamling device to a truck tractor or trailer has a positive effect on operating efficiency due to the reduction in overall aerodynamic drag at highway speeds. A number of devices have appeared for this purpose, including U.S. Pat. No. 4,030,779, issued to applicant. Streamlining devices have proliferated since the energy crunch in the early seventies.

The instant invention relates to a particular type of trailer, specifically the "container" of the type which is removed completely from the tractor and train and stacked several deep in the hold of a ship. The container is a very blunt type trailer, designed to pack very compactly in containerships for oceanic transport. When removed from the ships, the containers are placed on the trailer frames with wheels to become very blunt semi-trailers. These trailers are in need of a streamlining device. Although they may be pulled by tractors with cab-mounted steamling devices, theses are generally ineffectual due to the large space between the tractor and the container-trailer. Since the nature of the container industry requires compact stacking and packing, it is not practicable to incorporate permanently installed streamlining devices on the containers.

There is thus a need for a termporarily installed streamlining device for shipping containers which may be installed to reduce drag during land-based transport and removed for ocean transport. It is also highly desirable that such a removable system be quick and simple to attach and remove and be capable of installation and removal by an unaided truck driver while standing on the ground. It is further desirable that the streamlining device be collapsible into a relatively small package so that it easily fits in the tractor cab when not in use.

The instant invention fulfills all of the above needs by providing an inflatable streamlining body with apparatus, including a pair of mounting poles, which can be used to hoist the inflated body up and secure it to the upper front portion of the container.

To install the apparatus, the two mounting poles each have a hook detent at the top and these hooks are hooked into the respective lifting holes which are provided in the corners of the container. Once the tops of the poles are engaged, the bottom ends of the poles are cinched down into the lower loading holes of the container, so that the two poles mounted in this fashion provide a frame for the mounting of the inflatable body.

Either before or after inflating, the inflated body is pulled into place with a pair of ropes or lines that engage through pulleys in the upper ends of the mounting poles and are fastened to D rings in the upper portion of the inflatable body. These ropes may also pass through D rings in the lower portions of the inflatable body, subsequent to which they also are cinched to the container body for a strong, reliable mounting.

BRIEF DESCRIPTION OF THE DRAWINGS

FIG. 1 is a perspective view of a container in place on a set of wheels and a frame and having the streamlining device mounted to the front;

FIG. 2 is a perspective view of the front end of a container illustrating the mounting of the mounting poles;

FIG. 3 is a side elevation view of the front portion of the container showing the streamlining body with the interior structure of the inflatable body indicated in phantom;

FIG. 4 is an elevation view of a detail of the mounting pole;

FIG. 5 is a perspective view of a corner of the container illustrating the lifting holes therein;

FIG. 6 is a perspective of the mounting bracket for the lower left end of the mounting pole;

FIG. 7 is a section taken through a modification of the apparatus.

DETAILED DESCRIPTION OF THE PREFERRED EMBODIMENT

The main part of the streamlining apparatus is the inflatable body generally indicated at 10. The exact nature and shape of this inflatable is subject to a wide range of designer's choice, although particularly effective embodiments are illustrated herewith. In the principal embodiment, what will be termed a "rectangular annulus", more or less a squared-off torus or doughnut, is shown at 12 in FIGS. 1 and 3. This doughnut, as well as the rest of the inflatable portion, is made from tough, airtight fabric of the same nature and quality as the rubberized fabric that inflated boats are made from.

The rectangular opening 14 in the center of the annulus is covered with an elongated inflatable tube 16 which is round in center cross-section and flattens out toward the ends like a toothpaste tube. This section normally would communicate with the outer section 12, although tubes 12 and 16 could be separate and inflated separately, and both sections should be covered with a fabric fairing member 18 to minimize drag.

Near the top of the rectangular annulus are a pair D rings 20, and a similar pair 22 are mounted at or near the bottom of the annulus. An inflation spout is shown at 24 so that the inflatable can be inflated from the compressed air of the tractor, which is readily available and used for the the vehicle braking system. A special hose with a pressure regulator would be used to couple to the tractor hose prior to connecting the tractor hose to the container brake system. This would provide a safe air source at low pressure and would be used only for the inflation of apparatus 10, after which inflation value 24 would be tighter.

The remaining structure is separate from the inflatable body portion itself and comprises principally a pair of mounting poles 26. These poles are ideally in two sections joined together at 28 through a male-female connection or the equivalent, and it is preferable that rubber bumpers 30 be slipped over the poles to prevent them from clattering against the front face of the container 32.

At the upper end of each pole is a hook 34 in FIG. 4. This hook cooperates with a standard lifting molding 36, detailed in FIG. 5, which has three lifting holes 38. The hook is engaged in the top hole and at the bottom of the pole an adjustable cinch 40 is mounted. This adjustable cinch, similar to a seat belt, or cargo strap ratchet buckle, could be replaced by a resilient length of rubber or the like. In any event, at the bottom of this member is a specialized mounting bracket 42, detailed in FIG. 6, which engages in a lifting hole 38 at the lower front edges of the container shown in FIG. 3. It will be noted from FIGS. 2, 4, and 6 that the shape of this specialized bracked insures that upward pulling on the bracket will more securely hold the pole in front of the container, rather than tending to swing it to the side. This is important as the containers are almost eight feet wide, and thus federal regulations would be violated should the poles swing to the side of the container.

Once the two poles are hooked into the upper moldings, hooked into the lower moldings through the cinch and cinched down tightly, the inflatable body is hoisted up as follows. At the upper end of the pole, in the hook region, is a hole 44 shown in FIG. 4, or the equivalent structure necessary to mount a pulley 46. Before the poles are raised, lines 48 are passed through the pulleys. These lines may be directly connected to the upper D rings 20, or may be affixed with hooks 50 so they can be engaged into the D rings subsequent to raising the poles. Once engaged on the inflatable, the lines are tightened to achieve the configuration indicated in FIG. 4, with the lines being passed through the lower D rings 22 and tied around a frame member of the wheel frame 52, or otherwise securely engaged to the container. A safety chain 54 is also attached to the lower D ring and has a clip 56 to lock into the lower lifting holes 38.

The hook as shown in FIG. 4 comprises welded sections to achieve the tight corners necessary for a good fit, a positive connection, and to eliminate the wearing of a tube which had a radius. However, it would also clearly be possible to bend the end rather than connecting several pieces as shown in the drawing. Also, clearly other types of pulley mounts could be used, and the lower D rings 22 could be separately tied down into the lower lifting holes, such as with a rubberized shock cord.

In a modification of the inflatable body, as shown in FIG. 7, it would be possible to incorporate an auxiliary tube 58, either communicating with the rectangular annulus or separately inflated. This tube is so positioned that when wrapped with a fairing member 60, it tends to fair the sides of the inflatable more smoothly to the contour of the container sides as can be seen in FIG. 7. This configuration is operated exactly the same as the first embodiment, and the fairing shape of the inflatable sides is thus completely portable with the inflated body and is not attached to the front of a trailer other than with the D ring.

In either embodiment, subject to engineering modifications for convenience, the invention is quick to install, can be installed by one man, and can be installed from the ground. For an invention of this nature to be successful, these requirements must be met. In short truck runs, such as from Los Angeles to San Diego, a truck driver may make several runs in a single day. Therefore, unless such a device is easily removable and installable and can be done without danger of injury, it is not likely to be popular or used.

The instant invention, however, fulfilling all of the above requirements, adds yet another step to the energy savings consciousness of America.

While I have described the preferred embodiment of the invention, other embodiments may be devised and different uses may be achieved without departing from the spirit and scope of the appended claims.

What is claimed is:

1. An apparatus for streamlining the bluff front of a trailerized shipping container having two upper front corners with lifting holes therein, said apparatus comprising:
   (a) engaging means including two hooks for releasably engaging said front corners;
   (b) a streamlining body;
   (c) means securing an upper portion of said body to said engaging means;
   (d) means tying the lower portion of said body down to a lower portion of said container; and,
   (e) each of said engaging means being mounted on a pole of sufficient length to permit a person standing in front of said container to engage each of said holes with a respective one of said hooks from the ground.

2. An apparatus according to claim 1 wherein said corners each has a top hole and said hooks are depending from the respective tops of said poles for positively engaging the respective top holes in the respective upper front corners of said container.

3. An apparatus according to claim 1 wherein said respective engaging means and poles are integral and together become attached to the front of said container, and including means to tie down the bottoms of said poles.

4. An apparatus according to claim 3 wherein said tie-down means is adjustable.

5. An apparatus according to claim 1 wherein said engaging means each mount pulleys having threaded therethrough lines attached to said body for hauling same up against said bluff front.

6. An apparatus according to claim 5 wherein said streamlined body is inflatable.

7. An apparatus according to claim 6 wherein said inflatable body has an upper and lower pair of rings mounted thereto, said other rings connect to the ends of said lines, and said lines pass from said upper rings through said pulleys, down through said lower rings, and are tied down at the bottom of said container.

8. An apparatus to claim 1 wherein said poles are each comprised of releasably connected segments and have resilient bumpers spaced along their length.

9. An apparatus according to claim 8 wherein said containers have lower front corners with lifting holes therein, and the lower ends of said poles are connected brackets engaged in said holes.

10. A method of temporarily mounting an inflatable streamlining body onto the bluff front of a trailerized shipping container having two forward upper corners with lifting holes therein by utilizing two poles with corner engaging means on the upper ends thereof, with pulleys mounted on said engaging means, and with tie-downs connected to the bottoms of said poles, wherein said inflatable body has a pair of upper rings and a pair of lower rings mounted thereto, said method comprising the following steps:
   (a) attaching respective ones of two lines respectively to said upper rings;
   (b) passing said lines through respective ones of said pulleys;
   (c) manually engaging said engaging means on said upper forward corners by manipulating said poles;
   p1 (d) tying down said tie-downs to a lower portion of said container;
   (e) hauling on said lines to raise said body to the upper portion of said bluff front and securing said lines; and
   (f) securing the lower rings of said body to said container.

11. A method according to claim 10 wherein step (f) comprises passing said lines through said lower rings prior to securing said lines.

12. A method according to claim 10 wherein said container has lifting holes in the lower front corners thereof, said tie-downs terminate in brackets, and step (d) comprises engaging said brackets in the holes in said lower front corners.

13. An apparatus for streamlining the bluff front of a trailerized shipping container having two upper front corners, said apparatus comprising:
   (a) engaging means comprising a pair of poles each having a hook mounted on an upper end thereof for engaging said front corners;
   (b) a pair of pulleys mounted to said engaging means;
   (c) means engageable to the upper portion of a streamlining body for hauling same up against said bluff front by use of said pulleys; and,
   (d) means engageable to a lower portion of said streamlining body to hold same down to a lower portion of said bluff front.

14. An apparatus according to claim 13 wherein said two upper front corners each has a lifting hole therein and said hooks respectively engage in said lifting holes.

15. An apparatus according to claim 13 wherein said poles are of sufficient length to be operative from ground level to engage said engaging means with said corners.

* * * * *